United States Patent [19]

Tomantschger

[11] Patent Number: 5,194,799
[45] Date of Patent: Mar. 16, 1993

[54] BOOSTER BATTERY ASSEMBLY

[75] Inventor: Klaus Tomantschger, Mississauga, Canada

[73] Assignee: Battery Technologies Inc., Mississauga, Canada

[21] Appl. No.: 667,478

[22] Filed: Mar. 11, 1991

[51] Int. Cl.$^5$ .............................................. H02J 7/00
[52] U.S. Cl. .......................................... 320/2; 320/7; 320/48
[58] Field of Search .......................... 320/2, 5, 6, 7, 15, 320/16, 48

[56] References Cited

U.S. PATENT DOCUMENTS

| | | | |
|---|---|---|---|
| 3,590,357 | 6/1971 | Reid | 320/7 |
| 3,638,108 | 1/1972 | Channing | 324/24.5 |
| 3,654,538 | 4/1972 | Gardberg | 320/7 |
| 3,950,688 | 4/1976 | Sancey et al. | 320/2 |
| 3,959,706 | 5/1976 | Mabuchi et al. | 320/2 |
| 4,161,682 | 7/1979 | Corvette | 320/2 |
| 4,366,430 | 12/1982 | Wright | 320/25 |
| 4,398,139 | 8/1983 | Prinsze | 320/2 |
| 4,420,212 | 12/1983 | Wright | 339/113 |
| 4,423,378 | 12/1983 | Marino et al. | 320/48 X |
| 4,443,751 | 4/1984 | Humphrey | 320/2 |
| 4,467,264 | 8/1984 | Blake et al. | 320/2 |
| 4,490,667 | 12/1984 | Mullersman | 320/48 |
| 4,667,141 | 5/1987 | Steele | 320/2 |
| 4,791,347 | 12/1988 | Britton | 320/2 |
| 4,885,524 | 12/1989 | Wilburn | 320/25 |
| 4,902,955 | 2/1990 | Manis et al. | 320/2 |
| 4,983,473 | 1/1991 | Smith | 429/48 |
| 5,068,570 | 11/1991 | Oda et al. | 315/128 |
| 5,107,197 | 4/1992 | Arlinghaus | 320/15 |

Primary Examiner—William H. Beha, Jr.
Assistant Examiner—Kristine Peckman

[57] ABSTRACT

A booster battery assembly is provided, where the booster battery is intended for use to provide additional energy to vehicle batteries, while connected in parallel with such vehicle batteries, so that a sufficient source of cranking current is available. Moreover, it is important for the terminal voltage of the vehicle battery as boosted by the booster battery assembly to be about 6.0 to 8.4 volts for an average automobile in order for ignition to be initiated and maintained during cranking. The booster battery assembly is portable, or it may be permanently installed in the vehicle, but isolated from the vehicle battery. In any event, the booster battery assembly of this invention comprises a battery of the same terminal voltage as the vehicle battery but of much smaller capacity. The booster battery may be charged from the vehicle battery during a time when the vehicle alternator is operating, or it may be recharged from an AC source. It is also contemplated that the booster battery may be a one-shot, reserve type standby battery. The booster battery assembly is not intended to replicate an automobile battery, merely provide some additional starting energy to permit engine cranking and to maintain spark ignition during cranking.

11 Claims, 2 Drawing Sheets

BOOSTER BATTERY ASSEMBLY

FIELD OF THE INVENTION

This invention relates to booster batteries, and particularly booster battery assemblies intended for use to provide additional energy to vehicle batteries to provide sufficient cranking energy to start the vehicle. Booster battery assemblies of the present invention are intended generally to be quite small and portable. They must be capable of assisting in cranking the vehicle almost immediately after being connected to the vehicle starter battery, without having to provide for a period of time in which the vehicle battery might be recharged. The booster battery assemblies of the present invention are not intended to replicate vehicle batteries per se. The booster battery assemblies of the present invention may be charged from alternating current or direct current sources. As well, they may provide an auxiliary source of battery power for short periods of time.

BACKGROUND OF THE INVENTION

There is a relatively high requirement for the provision of booster batteries to the market, where the booster batteries are intended only to provide a "topping up" for a vehicle battery that has been discharged to such an extent that the vehicle battery is incapable of delivering sufficient energy so as to provide cranking and thereby starting of the vehicle. Such conditions normally arise due to the fact that the operator of the vehicle has inadvertently left the lights, radio, or other energy consuming device or accessory running in the vehicle after the vehicle ignition has been turned off. In such circumstances, the only source of power to continue to maintain the lights or other devices or accessories operating is the battery of the vehicle; and in time, the battery may be significantly reduced as to its reserve capacity.

It must be recognized, however, that in order to start the vehicle there must be cranking power delivered to the starter to begin turning the engine over. Assuming that other starting conditions are correct, once an engine has been cranked or turned over for several seconds, it is capable of sustaining its own ignition and operation. At that time, the vehicle alternator will begin delivering all necessary electrical power to the vehicle and its devices and accessories, as well as to begin to recharge the vehicle battery.

It must be kept in mind, as well, that a so-called "dead" battery in a vehicle, typically a depleted battery that has developed as a consequence of, for example, having left the lights of the vehicle operating when the ignition was turned off, is not usually completely exhausted. Other such "dead" battery circumstances may occur in a battery that has degraded with age so that it is incapable of starting the vehicle at low ambient temperatures, or a battery which is nearing the end of its useful life and which has a reduced capability of "holding its charge" over long periods of time. Thus, while the battery is not "dead" there may be insufficient power capability in the vehicle battery that can be sustained for a long enough period of time for the starter relay to close and remain closed; and particularly to deliver an appropriate starting current to the starter motor and to initiate the starting operation for the internal combustion engine of the vehicle. Of course, the internal combustion engine may be a standard engine, where a spark at its spark plugs must be maintained; or it may be a diesel engine requiring a continuing glow plug activation during the starting sequence of the diesel engine.

It is important for there to be sufficient voltage provided to the electrical ignition system of the vehicle during cranking for there to be a spark—or glow plug operation—initiated and maintained within the engine. It is normally accepted that the necessary starting voltage to initiate and maintain a spark, in an ordinary vehicle having a nominal 12 volt vehicle battery, is in the order of from 6.0 to 8.4 volts.

On the other hand, it has been noted that if a battery of even small capacity and low internal resistance is connected in parallel to the vehicle battery, and that other battery—parallel designated in general as a booster battery—is sufficiently fully charged that its terminal voltage is at its rated voltage and remains at the rated voltage during a discharge operation therefrom, then energy can be transferred from the booster battery to the vehicle battery sufficiently that at least the terminal voltage of the vehicle battery may stabilize. Then, even a relatively short cranking period will be sufficient to start the vehicle, when the spark is initiated and maintained during cranking.

As noted, it is usually necessary for the starting voltage in the vehicle to be maintained at least at the level of from about at least 6.0 to 8.4 volts for the period of time that the cranking operation continues. That period of time may only be a few seconds.

Thus, a booster battery may be provided that has a relatively low capacity in itself, perhaps even as little as 2.5 Ah to 5 Ah, and a typical vehicle starting battery may have a capacity of 20 Ah to 100 Ah. Such vehicle batteries are often designated by the term "SLI", meaning that the battery may be used and has as its purposes the function of Starting, Lighting, and Ignition in the vehicle. As noted, SLI batteries may generally have a relatively high capacity, and be capable of delivering a high current—at least for the Starting and Ignition functions.

However, in general a booster battery need not be called upon to deliver very high current—the equivalent of the full current requirements of the starter motor of a vehicle—but there may be a requirement for a relatively high current to be delivered for a short period of time, while maintaining sufficient voltage that a spark can be initiated within the engine so that ignition can be maintained.

Of course, there are other alternatives to the provision of a booster battery assembly in keeping with the present invention. In the event that an owner of a vehicle notices that he has a "dead" battery and cannot start the vehicle, he could arrange for the vehicle to be towed to a garage. There, or if the owner has access to another vehicle, the "dead" battery could be boosted using jumper cables from the other vehicle, or from a similar battery often kept on a cart so as to be transportable around the garage floor. If the vehicle owner has access to a battery charger—usually a small AC operating unit that essentially trickle charges the battery over a period of at least a few hours —and he has the time, then he could recharge the battery using the charger.

Still as another alternative, the vehicle battery could be recharged from another small battery; and a small battery that is of the correct terminal voltage but incapable of delivering high current—particularly a sustained high current—could be used for such a purpose.

There is also available an SLI vehicle battery having a separate reserve battery contained in the same casing but physically and electrically isolated from the main battery The reserve battery may be connected to the main battery to function as a booster by manually closing a switch for only as long as is necessary to start the vehicle; and thereafter the switch is manually opened to electrically isolate the reserve battery from the main battery—but not from the electrical system of the car so that the reserve battery may again be recharged.

On the other hand, the purpose of the present invention is to provide a portable (as opposed simply to being transportable) booster battery assembly that is independent of the main vehicle battery, so that it is light in weight and easily used.

Thus, the present invention provides a booster battery assembly for vehicles—as well as a utility standby battery -which will immediately provide for additional energy when connected in parallel with the vehicle battery. It will be understood, of course, that the term "vehicle" not only includes cars and trucks, but can be equally applied to such installations as motors for boats—both inboard and outboard motors—motorcycles, snowmobiles, farm tractors, and, perhaps, even to small recreational aircraft and the like.

What the present invention does not provide is a battery which essentially replicates the size and capacity of the vehicle battery, because as discussed above, that replication is not necessary. Moreover, it is not the purpose of the present invention to provide a source of recharging the vehicle SLI battery over a long period of time so as to restore its cranking power.

The booster battery assembly of the present invention provides a device that has substantially equal terminal voltage to the rated voltage of the vehicle battery to be boosted, usually 6 volts or 12 volts; and of course, cables for connecting the booster battery to the vehicle battery are a portion of the booster battery assembly. Generally, for safety reasons a switch is provided which permits the connection of the booster battery to the vehicle battery to be concluded after the physical connections of the cables have been made; and generally, a fuse is provided in series with the switch to preclude unwarranted very high current drain from the booster battery per se. This precludes any short circuiting of the booster battery, in the event that it is inadvertently mishandled.

As noted, the capacity of the booster battery may be relatively low, generally in the range of from 1% to less than 25% of the ampere-hour rated capacity of the vehicle battery. In general, a booster battery assembly according to the present invention is compact and easily portable, having a weight of less than about 3.0 Kg to 5.0 Kg.

It should also be noted that the present invention provides for the booster battery to be recharged in any suitable manner. Thus, the simple expedient step of providing a battery charger intended to deliver charging energy to the booster battery from a source of alternating current electricity is obvious, and is provided for. Moreover, it is possible under certain conditions for the booster battery to be recharged from a direct current source of appropriate voltage, such as by being plugged into the cigarette lighter of a vehicle. Thus, the booster battery of the present invention may be essentially self-contained, in that it is possible to carry the booster battery assembly in the vehicle until such time as it is necessary to be used, then use it to start the vehicle, and then recharge the booster battery from the vehicle electrical system when the engine is running and therefore the alternator or other engine-driven electrical generation system in the vehicle is operating.

Obviously, suitable indicator lamps can be provided to indicate when the booster battery is connected across the terminals of the vehicle battery, and that the switch has been closed so that energy is flowing from the booster battery to the vehicle battery. Likewise, a lamp annunciator may be provided to indicate when the booster battery is being recharged. The charging lamp can be arranged so as to be illuminated, whether the booster battery is connected to an AC source charger, or a DC source.

Because the booster battery of the present invention may also be operated as a portable power pack or standby power source, means such as the cigarette lighter socket assembly from a vehicle may be provided and connected to the booster battery, generally on the side of the switch which is remote from the booster battery, so as to permit accessory items such as an emergency Work light, a spot light, a vacuum cleaner, an air compressor or the like, to be powered directly from the booster battery.

The battery that is chosen for the booster battery assembly may be selected on the basis of being one that has high power density, or it may have high energy density, or both. A battery chosen for incorporation in a booster battery assembly for the present invention is one that has low internal impedance, and exhibits a long shelf life. It should also be one that is a generally rechargeable, and if so it should be a battery that is capable of undergoing a high number of charge and discharge cycles. Suitable batteries may be chosen from the group of lead acid batteries, nickel cadmium, other nickel metal hydride batteries, nickel zinc, silver zinc, and rechargeable alkaline manganese dioxide batteries.

It is also possible, of course, for the booster battery of the present invention to be non-rechargeable and of the reserve type. In other words, it may be possible in some conditions and for certain applications such as emergency equipment, military purposes, and the like, for the booster battery to be of such a type that it will be used only once. Generally, those batteries are of the sort where the electrolyte is stored separately from the positive and negative electrodes—the plates—of the battery, and is permitted to flood the positive and negative electrodes of the battery only when it is intended to be utilized. Such batteries may be such that they might self-discharge quite quickly after they have been activated, so that their utilization must be effected shortly after the electrolyte has been permitted to flood the plates thereof.

PRIOR ART

Several patents are to be noted as being ones directed to the provision of booster batteries, or battery boosters, of one sort or another. Nearly all of the prior art is, however, directed to very complicated electrical arrangements, or to high capacity batteries, whereby substantially all of the cranking power necessary to start a vehicle may be provided, immediately upon connection of the booster battery or battery booster to the vehicle. All prior art booster battery arrangements are typically transportable, but not easily portable.

REID, U.S. Pat. No. 3,590,357, issued Jun. 29, 1971, provides a battery booster system to give the required energy for boosting a weak vehicle battery. However, Reid requires the use of main and auxiliary electrical contacts, and is particularly directed to the circumstance Where the battery booster is connected to a vehicle and arcing might occur because of energy that remains stored in the starter circuit of the vehicle.

CHANNING, U.S. Pat. No. 3,638,108, issued Jan. 25, 1972, provides a booster and automobile electrical system tester. Here, however, the booster battery essentially replicates the vehicle battery, and is adapted so as to provide all of the necessary cranking energy This system is clearly one which is transportable but not easily portable.

U.S. Pat. No. 3,654,538, issued Apr. 4, 1972 to GARDBERG provides a battery booster circuit that is carried by road service vehicles. Two batteries are carried, and are connected so that both will be charging or discharging at any given time at substantially the same rate; and the patent is particularly directed to the circumstances where there is not appreciable voltage across the battery of the stalled vehicle being serviced.

WRIGHT was issued U.S. Pat. No. 4,366,430 on Dec. 28, 1982, where voltage and polarity detecting means are specifically provided. The concern there is simply to ensure that a connection not be made inadvertently, using the wrong polarity, where an explosion of gases that may accumulate near the battery terminal, might occur. A further patent relating to the same provisions was issued to Wright as U.S. Pat. No. 4,420,212 on Dec. 13, 1983.

MARINO et al. were issued U.S. Pat. No. 4,423,378 on Dec. 27, 1983, for an invention relating to a test apparatus intended particularly to determine the condition of the battery in a vehicle. This invention is not particularly directed to any apparatus for boosting the vehicle battery, but rather to provide an apparatus to be operated by qualified service personnel who may be called upon to advise the vehicle owner when service or replacement of the vehicle battery is required.

HUMPHREY was granted U.S. Pat. No. 4,443,751 on Apr. 17, 1984, for a portable battery booster where a charger may be connected to a suitable bar by being clamped thereto, and to which the terminals of a booster battery to be charged may also be clamped, so as to charge the booster battery. However, this assembly is one where a full size battery is maintained such as by a service station for purposes of a transportable rather than a portable battery to replicate the capacity characteristics of a vehicle battery.

SMITH U.S. Pat. No. 4,983,473 provides what is stated to be an auxiliary power source to be used for starting a vehicle or the like having a defective starter battery. A battery, jumper cables, and even a charger for the battery, may all be self contained in a housing for the assembly.

One other prior art reserve automobile starter battery is briefly referred to above, comprising a separate reserve battery that is contained in the same casing but physically and electrically isolated from the main SLI battery. It is available from GNB incorporated, and is identified by the trademark CHAMPION SWITCH (TM). However, in this case the reserve battery is used only for purposes of boosting the main battery in the event that, for example, the vehicle lights have been left on and the vehicle cannot be started; and the reserve battery is not in any way separable from the main battery for any other purposes whatsoever.

BRIEF DESCRIPTION OF THE DRAWINGS

The present invention will be described in association with the Figures accompanying this application, in which.

DESCRIPTION OF THE PREFERRED EMBODIMENTS

Figure 1:
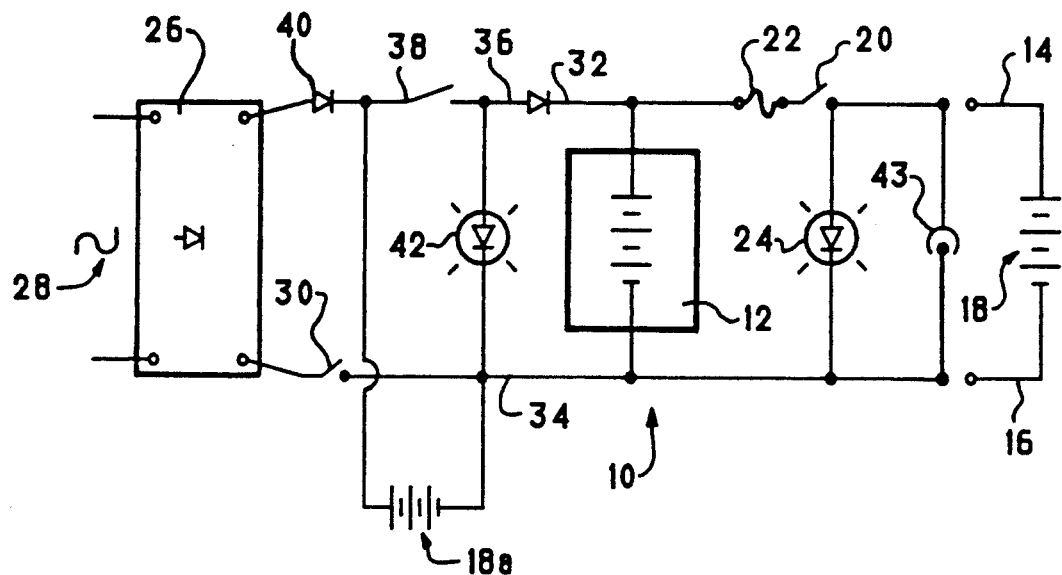
FIG. 1 is a representative schematic of a booster battery assembly with several different features of the assembly being illustrated.

Reference is made to FIG. 1. It will be noted that the circuit shown in FIG. 1 is not specifically representative of any given booster battery assembly, and its circuit circumstances for charging and discharge, but rather that the circuit of FIG. 1 proposes several characteristics and features for booster battery assemblies of the present invention. Not all of those characteristics are features that may necessarily be found in the same physical booster battery assembly.

The booster battery assembly 10 of FIG. 1 includes, in its basic embodiment and as the principal components of any booster battery assembly in keeping with the present invention, at least the following components:

First, a booster battery 12 is provided that has substantially equal terminal voltage to the rated voltage of the vehicle battery to be boosted. Cables 14 and 16 are schematically indicated, and are provided to connect the booster battery to a vehicle battery to be boosted. That vehicle battery is indicated at 18 (and, as noted hereafter, at 18a). A switch 20 is provided in series with the cable 14 or 16 (only one switch, at one side of the circuit is required) so as to provide a connection between the booster battery 12 and the vehicle battery 18, after the cables 14 and 16 have been put in place. A fuse 22 is provided in series with the switch 20. Alternatively, the fuse 22 and switch 20 could be provided as a single entity, such as a circuit breaker switch. However, even a circuit breaker switch provides at least the operating characteristic of a fuse or switch—in one way or another to open the circuit. There is also provided protection against inadvertent wrong polarity connections being made.

Thus, in its most simple embodiment, what is provided is an assembly to connect the booster battery to a vehicle battery, including a fuse and a switch. However, as noted above and in keeping with the present invention, the capacity of the booster battery is relatively small compared with the capacity of the vehicle, and is generally in the range of from about 1% to less than 25% of the ampere-hour rated capacity of the vehicle battery 18. A booster battery assembly of the present invention may generally have a weight of about 3.0 Kg to about 5.0 Kg.

As thus far described, a lamp 24, such as a LED, may be provided across the terminals of the booster battery 12 at a position on the side switch 20 which is remote from the booster battery 12. Therefore, when the booster battery 12 is connected to the vehicle battery 18, and the switch 20 is closed, the lamp 24 will be illuminated. The lamp 24 may be zener operated in such a manner that it will only illuminate when it is connected across the voltage of the booster battery 12, but not across a substantially depleted terminal voltage of the vehicle battery 18.

It has been noted that it is the intention that the booster battery 12 be capable of being recharged, so that it maintains a substantially full charge capacity at all times. To that end, a battery charger that is schematically indicated at 26, taking its input from a source of alternating current 28, may be provided to deliver charging energy to the booster battery 12. A switch 30 is shown, but that switch 30 is intended more to show the optional physical connection of the battery charger 26 to the booster battery 12, than to indicate a physical switch in a specific circuit arrangement. Obviously, suitable cable means such as indicated generally at 32 and 34 must be provided so as to deliver energy from the charger 26 to the booster battery 12. A diode 36 may be provided to preclude backflow of energy from the booster battery 12 to the charger 26.

A further switch 38 is also shown, and like the switch 30 it is not necessarily intended to represent a physical switch in a specific booster battery assembly in keeping with the present invention. Rather, the switch 38 is shown to allow for a further battery charging capability, and that is the capability of charging the booster battery 12 from the vehicle battery as is shown at 18a, when the vehicle battery 18a is, itself, fully charged; or at least from the vehicle alternator which charges the battery 18a. Thus, in any event, in order for the booster battery 12 to be charged, the switch 38—as shown—must be closed; and that simply means that a physical connection of the source of charging energy such as the battery 18a is made. If the source of charging energy is the charger 26, then the presence of switch 30 indicates the requirement that the charger 26 be receiving energy from its AC source 28.

Moreover, in certain specific embodiments of booster battery assemblies according to the present invention, the leads from a charger 26 may be permanently connected to the booster battery 12, so that the act of closing switch 30 is effected essentially by plugging an AC charger into an appropriate source of charging energy.

Connecting the booster battery 12 to the vehicle battery 18a may simply involve plugging wires which are also permanently connected to the terminals of the booster battery 12 and to a cigarette lighter plug into a cigarette lighter socket—a step that may be visualized by closing the switch 38. Because arrangements may be made for wires to the charger 26 and to the battery plug for connection through a battery socket to the vehicle battery 18a all to be permanently connected, the additional diode 40 is provided to protect the charger 26.

If the booster battery 12 is receiving a charging energy from either of the charger 26 or the vehicle battery 18a—but, in most circumstances, not both—then a further lamp 42 such as a LED may be provided to be illuminated. The LED 42 would be illuminated when the charger 26 is connected and operating, and thereby providing delivery of charging energy at an appropriate voltage across the terminals of the booster battery 12; and likewise, when the booster battery 12 is connected to the vehicle battery 18a.

Because the booster battery assembly of the present invention may, in some circumstances, function as a portable power pack, a connection or socket means which is essentially identical to a cigarette lighter socket may be connected across the terminals of the booster battery 12. This is shown schematically at 43; and as noted above, battery or low voltage operated devices such as emergency lamps, search lamps, a vacuum cleaner, etc., may be powered for a short term from the booster battery 12 by being connected their own plug to the cigarette lighter socket arrangement 43.

It has been noted above that the booster battery 12 may be essentially a single use, reserve type standby battery.

Obviously, to operate the booster battery assembly to provide sufficient starting energy to the vehicle battery 18, the appropriate connections are made as discussed above. In actuality, a pair of cables may be provided having clamps at one end of each cable to be connected to the terminals of the vehicle battery 18; and having a polarized plug at the other end of each cable for connection to a provided socket in the booster battery assembly. Then, after the cables are connected to the vehicle battery 18 and to the socket connection for the booster battery 12, the switch 20 is then closed and energy will flow from the booster battery 12 to the vehicle battery 18. In the usual circumstances, the voltage of the booster battery 12 is approximately 12 volts, and the rated voltage of the vehicle battery 18 is also 12 volts although the actual terminal voltage of the vehicle battery may have reduced to as little as 9 or even 6 volts. In any event, after connection of the booster battery 12 to the vehicle battery 18, the voltage of the parallel connected batteries rises to above 9 volts, which is necessary to initiate and sustain spark ignition during cranking as discussed above.

Figure 2:
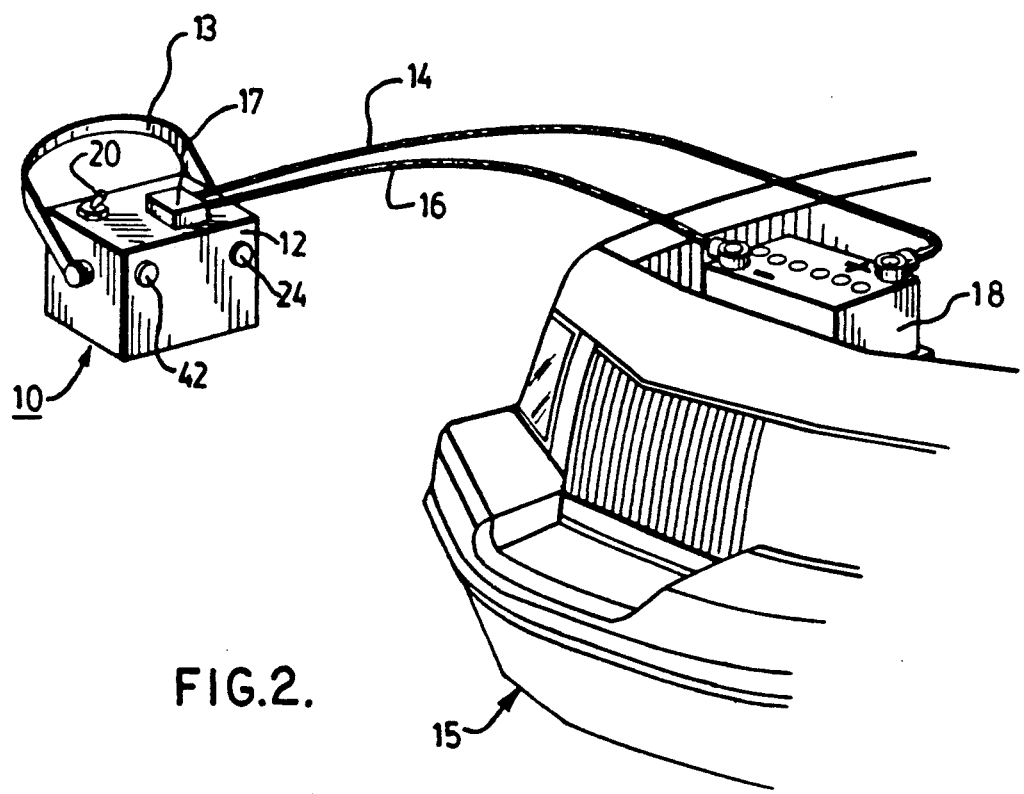
FIG. 2 is a sketch showing a typical use of the booster battery assembly of the present invention.

FIG. 2 illustrates a typical booster battery assembly 10 in use. The booster battery 12 is shown connected to a vehicle battery 18 in vehicle 15, and cables 14 and 16 are connected between the booster battery 12 and the vehicle battery 18. The booster battery assembly 10 is conveniently carried such as by handle 13. The switch 20 is shown on the booster battery assembly 10, as are lamps 24 and 42. A polarized plug 17 is shown at the end of the assembly of cables 14 and 16, for easy connection of those cables to the booster battery 12.

Specific examples are now discussed:

First, it is assumed that the capacity of the vehicle battery 18, and its design, is such as to permit it to provide 100 amperes of cranking current to the starter motor to permit the vehicle to start. A typical battery may have a 12 volt, 450 CCA, 80 minutes RC rating. In other words, the battery has a rating of 450 Cold Cranking Amperes, with an 80 minutes Reserve Capacity. This suggests that the ampere-hour capacity of the battery is in the order of about 33 or 34 Ah. Normally, several seconds (usually less than 10 seconds) is required to start the vehicle engine, provided that there is sufficient voltage to initiate and maintain a spark during the cranking operation.

A standard vehicle battery of 12 volts, 450 CCA, 80 minutes RC rating was discharged for 60 minutes at a current of 25 amperes, to about 75% depth of discharge. Then, various fully charged booster batteries were, in repetitive but equivalent tests, connected in parallel to the vehicle battery and the parallel combination was discharged at 100 amperes.

Figure 3:
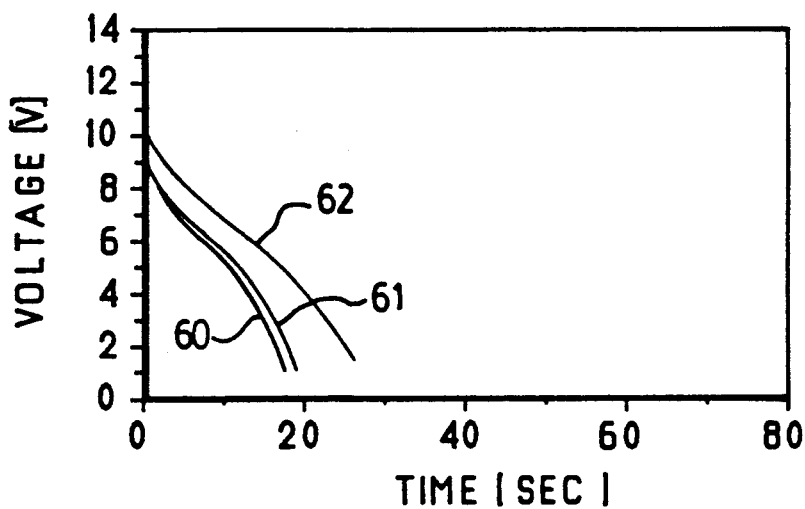
FIG. 3 provides representative voltage curves over time, of a set of tests performed using certain cell and battery assemblies as booster batteries.

The results of these tests are shown in FIG. 3. First, with reference to curve 60, the vehicle battery was discharged by being subjected to a cranking simulation test. This involved continuously discharging the vehicle battery at a constant current of 100 amperes, during which the terminal voltage of the battery was monitored. After only 8 seconds the terminal voltage of the vehicle battery reduced to 6 volts. Then, two strings of commercially available "D" alkaline batteries provided by Seacliff International Inc. of California, with a total weight of 2.24 Kg, where assembled to provide a booster battery having two six volt alkaline batteries each of 5 Ah capacity, as a 12 volt battery. That booster battery was, thereafter, connected to the discharged vehicle battery, and immediately thereafter a discharge of 100 amperes was conducted. The current contribution was noted to be 95 amperes from the vehicle battery, and 5 amperes from the booster battery. This is shown in curve 61.

Referring now to curve 62, the vehicle battery was charged for 10 minutes using the "D" booster battery discussed immediately above, and then a discharge test was conducted as before at 100 amperes. It can be seen by reference to curve 62 that because of the 10 minute charge from the "D" booster battery, the cranking simulation performance of the combined vehicle battery and booster battery showed a slight improvement. However, that improvement is not considered significant enough to ensure successful starting operation of the vehicle. It must be noted that, according to the instruction manual of the "D" booster battery that was commercially available, it is intended to be used to recharge the vehicle SLI battery by plugging the "D" booster into the cigarette lighter of the vehicle. Apparently it is the intention that the "D" booster be connected for at least 30 minutes via the cigarette lighter to hopefully provide sufficient charge back to the SLI battery, and that the "D" booster battery is to be disconnected from the vehicle battery prior to a starting operation. However, the purpose of a booster battery is to connect it to the vehicle battery and immediately begin a starting operation of the vehicle engine. Therefore, the intent to wait for 30 minutes, with no confidence that there would be sufficient cranking power restored to the vehicle battery, resulted in the specific test of the commercially available Seacliff International Inc. "D" booster battery being declared a failure.

Figure 4:
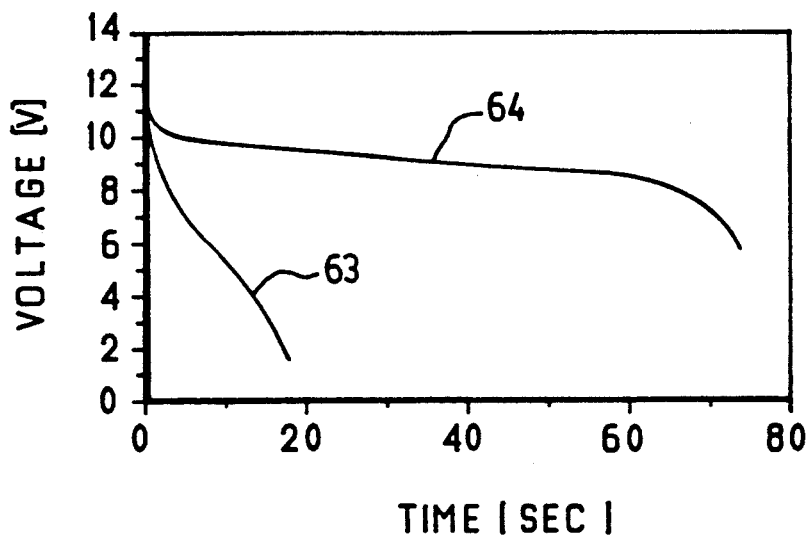
FIG. 4 is similar to FIG. 3 but showing other booster battery test results.

Referring now to FIG. 4, curve 60 appears once again, in the same manner as shown in FIG. 3.

With reference to curve 64, the booster battery that provided that curve was a 5 Ah, 12 volt GATES Energy CYCLON MONOBLOCK (TM's)lead-acid battery. Here, the vehicle battery provides 40 amperes, and 60 amperes were provided by the booster battery; and it is noteworthy that the starting voltage of 9 volts remained at that level for more than 50 seconds, which would ensure cranking and starting of the vehicle.

In all of the testing, it is noted that in order to provide 9 volts for at least a few seconds, and thereby maintain a spark for ignition, it is necessary for the booster battery to be able to provide a reasonable current for at least a short period of time, and for it to be capable of maintaining its terminal voltage above a predetermined limit such as 9 volts during that cranking period. Obviously, the booster battery does not need to replicate the vehicle battery, but it should have a capacity in the range of at least a few percent—say, at least about 1% and up to 10% or even 25% of the capacity of the vehicle battery.

Figure 5:
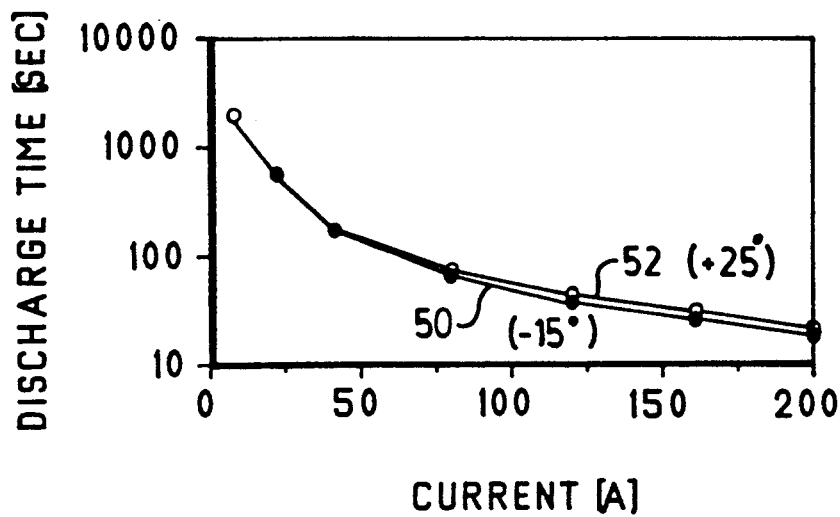
FIG. 5 provides curves showing further tests of booster batteries operating at high current discharge rates at different temperatures.

It is significant, as well, to note that starter battery problems are frequently encountered at low ambient temperatures. FIG. 5 is intended to illustrate typical curves of capacities at high current discharge rates of relatively small booster batteries, at room temperature and at −15° C. The booster batteries whose results are shown in FIG. 5 were Gates spirally wound $PbO_2/Pb$ MONOBLOC (TM) batteries, each having a terminal voltage of 6 volts and capacity of 2.5 Ah, thereby providing a 12 volt, 2.5 Ah battery having a total weight about 1.05 Kg. Curves 50 and 52 show the reduction in capacity of that battery. Curve 50 shows the characteristic at −15° C., curve 52 shows the characteristic at room temperature. It is clear from FIG. 5 that the use of such batteries as noted above as booster batteries can ensure excellent power capabilities, and that they are maintained even at low ambient temperatures.

Certain specific test results have been discussed. More particularly, care has been taken to note the available options for charging and recharging a booster battery while allowing for it to be of relatively small size and weight. A small booster battery assembly in keeping with the present invention is easily portable, and may be such that it can be stored in the trunk or even under the seat of an automobile without taking excessive volume and space, or without being excessively heavy. The scope of the present invention is defined by the appended claims.

We claim:

1. A light weight, easily portably booster battery assembly for vehicle battery boosting to provide additional starting energy when connected in parallel with a vehicle battery, comprising:

a booster battery having positive and negative terminals, and being of substantially equal terminal voltage to the rated voltage of the vehicle battery to be boosted;

cables for connected of said booster battery to said vehicle battery;

switch means in series with said cable means so as to provide electrical connection between said booster battery and said vehicle battery; and fuse means in series with said switch means;

wherein the capacity of said booster battery is in the range of from 1% to less than 25% of the ampere-hour rated capacity of the vehicle battery; and wherein said booster battery and said vehicle battery, in parallel combination, may be used to provide starting energy for a vehicle substantially as soon as said electrical connection is made between said booster battery and said vehicle battery.

2. The booster battery assembly of claim 1, wherein a lamp means is provided across said terminals of said booster battery, and said lamp is connected at a position on the side of said switch means, which position is remote from said booster battery, so that said lamp is illuminated only when said switch means is closed.

3. The booster battery assembly of claim 1, further comprising additional cables connected to said terminals of said booster battery; said additional cables being connected to a battery charger which is connected to a remote alternating current energy source, and which is intended to deliver charging energy to said booster battery from said remote alternating current energy source.

4. The booster battery assembly of claim 1, further comprising additional cables connected to said terminals of said booster battery; said additional cables being connected to a direct current source of appropriate voltage so as to delivery charging energy to said booster battery when said booster battery is connected to said direct current source.

5. The booster battery assembly of claim 4, wherein said additional cables maybe connected to said vehicle battery when said vehicle battery is fully charged, so as to be capable of delivering charging energy therefrom to said booster battery.

6. The booster battery assembly of claim 3, wherein a lamp means is provided across said terminals of said booster battery, and said lamp means is connected so as to be illuminated when said booster battery is connected to said battery charger.

7. The booster battery assembly of claim 4, wherein a lamp means is provided across said terminals of said booster battery, and said lamp means is connected so as to be illuminated when said booster battery is connected to said direct current source.

8. The booster battery assembly of claim 1, wherein a socket means is provided across said terminals of said booster battery, said socket means is connected at a position on the side of said switch means, which position is remote from said booster battery, so as to provide a means for connecting accessory items to said booster battery; where said accessory items are of relatively low power requirements and of equal voltage rating to that of said booster battery.

9. The booster battery assembly of claim 1, wherein said switch means and said fuse means are combined to function as a fused breaker switch.

10. The booster battery assembly of claim 1, wherein said booster battery is a reserve type standby battery that has at lease a portion of its electrolyte stored separately from the positive and negative electrodes thereof; whereby when it is desired to use said booster battery assembly, said electrolyte is allowed to flood said positive and negative electrodes, so that said booster battery assembly may be used only once.

11. The booster battery assembly of claim 1, wherein the weight of said assembly is less than 5.0 Kg, thereby rendering said booster battery assembly easily portable.

* * * * *